US007585565B2

(12) United States Patent
Schultes et al.

(10) Patent No.: US 7,585,565 B2
(45) Date of Patent: Sep. 8, 2009

(54) MULTILAYERED FILM MADE OF (METH)ACRYLATE COPOLYMER AND POLYCARBONATE

(75) Inventors: Klaus Schultes, Wiesbaden (DE); Michael Wicker, Seeheim-Jugenheim (DE); Klaus Albrecht, Mainz (DE); Mona Rueppel, Hoechst (DE); Gabriele Dassinger, Stockstadt (DE); Eric Reinheimer, Gross-Zimmern (DE); Johann Kappacher, Piesendorf (AT); Andreas Hollebauer, Zell am See (AT)

(73) Assignees: Roehm GmbH, Darmstadt (DE); Senoplast Klepsch & Co. GmbH, Piesendorf (AT)

( * ) Notice: Subject to any disclaimer, the term of this patent is extended or adjusted under 35 U.S.C. 154(b) by 61 days.

(21) Appl. No.: 10/577,954

(22) PCT Filed: Sep. 15, 2004

(86) PCT No.: PCT/EP2004/010298

§ 371 (c)(1),
(2), (4) Date: May 2, 2006

(87) PCT Pub. No.: WO2005/051657

PCT Pub. Date: Jun. 9, 2005

(65) Prior Publication Data
US 2007/0122624 A1    May 31, 2007

(30) Foreign Application Priority Data
Nov. 3, 2003 (DE) ................. 103 51 535

(51) Int. Cl.
B32B 27/36 (2006.01)
C08G 64/00 (2006.01)
(52) U.S. Cl. .............. 428/412; 264/176.1; 264/210.6; 264/219; 428/411.1; 428/220; 428/221; 428/450; 428/480; 524/450; 524/458; 524/502; 525/285; 528/196; 528/198
(58) Field of Classification Search ............ 264/176.1, 264/210.6, 219; 428/220, 221, 450, 480, 428/411.1, 412; 524/450, 458, 502; 525/285; 528/196, 198
See application file for complete search history.

(56) References Cited
U.S. PATENT DOCUMENTS

| 4,833,221 | A | 5/1989 | Albrecht |
| 5,110,877 | A | 5/1992 | Hoess et al. |
| 5,155,172 | A | 10/1992 | Siol et al. |
| 5,219,931 | A | 6/1993 | Siol et al. |
| 5,270,397 | A | 12/1993 | Rhein et al. |
| 5,280,073 | A | 1/1994 | Siol et al. |
| 5,548,033 | A | 8/1996 | Vetter et al. |
| 5,652,316 | A | 7/1997 | May et al. |
| 5,705,189 | A | 1/1998 | Lehmann et al. |
| 6,040,387 | A | 3/2000 | Albrecht et al. |
| 6,218,467 | B1 | 4/2001 | Wicker et al. |
| 6,287,470 | B1 | 9/2001 | Vetter et al. |
| 6,355,712 | B1 | 3/2002 | Schultes et al. |
| 6,576,255 | B1 | 6/2003 | Petereit et al. |
| 6,613,871 | B2 | 9/2003 | Hoess et al. |
| 6,765,046 | B1 | 7/2004 | Numrich et al. |
| 6,803,416 | B2 | 10/2004 | Schultes et al. |
| 6,809,163 | B2 | 10/2004 | Schultes et al. |
| 6,890,993 | B2 | 5/2005 | Schultes et al. |
| 6,998,140 | B2 | 2/2006 | Meier et al. |
| 7,046,952 | B2 | 5/2006 | Kurotori et al. |
| 7,179,852 | B2 | 2/2007 | Schultes et al. |
| 2002/0054991 | A1* | 5/2002 | Shibuya et al. ........... 428/319.3 |
| 2002/0160042 | A1 | 10/2002 | Petereit et al. |
| 2004/0104501 | A1 | 6/2004 | Petereit et al. |
| 2004/0116567 | A1 | 6/2004 | Schmitt et al. |
| 2005/0065224 | A1 | 3/2005 | Menzler et al. |

(Continued)

FOREIGN PATENT DOCUMENTS

DE    37 19 239    12/1988

(Continued)

OTHER PUBLICATIONS

Marin, Nicolas et al., "Co-continuous morphology development in partially miscible PMMA/PC blends", Polymer, vol. 43, No. 17, pp. 4723-4731, 2002.

(Continued)

Primary Examiner—Terressa M Boykin
(74) Attorney, Agent, or Firm—Oblon, Spivak, McClelland, Maier & Neustadt, P.C.

(57) ABSTRACT

The invention relates to a multilayered film comprising at least one upper layer a), a middle layer b) made of (meth) acrylate copolymer, and a supporting layer c) made of polycarbonate. Upper layer a) contains a light-stability agent and is made of a (meth)acrylate copolymer that, together with the polycarbonate of supporting layer c), can form partially compatible mixtures. A test piece, which is made from a mixture consisting of 20% by weight of (meth)acrylate copolymer and 80% by weight of polycarbonate, has a breaking elongation (ISO 527-2) of at least 75% at 23° C. The middle layer b) contains a colorant and, optionally, a light-stability agent and is made from an identical or different (meth)acrylate copolymer that, together with the polycarbonate of supporting layer c), can form partially compatible mixtures. A test piece, which is made from a mixture consisting of 20% by weight of (meth)acrylate copolymer and 80% by weight of polycarbonate, has a breaking elongation (ISO 527-2) of at least 75% at 23° C., and the supporting layer c) is made of polycarbonate that, optionally up to 30% by weight of the material of the layers, can contain a) and b). The invention also relates to the production and uses of the multilayered film and to partially compatible polymer mixtures consisting of (meth)acrylate copolymer and polycarbonate.

16 Claims, No Drawings

U.S. PATENT DOCUMENTS

| | | | |
|---|---|---|---|
| 2005/0080188 A1 | 4/2005 | Schultes et al. |
| 2005/0152977 A1 | 7/2005 | Petereit et al. |
| 2005/0267250 A1 | 12/2005 | Theil et al. |
| 2006/0052515 A1 | 3/2006 | Schultes et al. |
| 2006/0121248 A1 | 6/2006 | Lorenz et al. |
| 2006/0147714 A1 | 7/2006 | Schultes et al. |
| 2006/0175735 A1 | 8/2006 | Hoess et al. |
| 2007/0066708 A1 | 3/2007 | Goldacker et al. |
| 2007/0122624 A1 | 5/2007 | Schultes et al. |
| 2007/0123610 A1 | 5/2007 | Schultes et al. |
| 2007/0197703 A1 | 8/2007 | Neuhaeuser et al. |
| 2007/0222117 A1 | 9/2007 | Hoess et al. |
| 2007/0276093 A1 | 11/2007 | Schultes et al. |
| 2008/0242782 A1 | 10/2008 | Hager et al. |

FOREIGN PATENT DOCUMENTS

| | | |
|---|---|---|
| DE | 38 37 589 | 5/1990 |
| WO | 02/14427 | 2/2002 |

OTHER PUBLICATIONS

U.S. Appl. No. 10/577,954, filed May 2, 2006, Schultes, et al.
U.S. Appl. No. 10/575,477, filed Apr. 12, 2006, Wicker, et al.
U.S. Appl. No. 10/575,929, filed Apr. 14, 2006, Schultes, et al.
U.S. Appl. No. 11/748,874, filed May 15, 2007, Schultes, et al.
U.S. Appl. No. 11/720,653, filed Jun. 1, 2007, Schultes, et al.
U.S. Appl. No. 11/813,946, filed Jul. 13, 2007, Schultes, et al.
U.S. Appl. No. 11/817,407, filed Aug. 30, 2007, Hoess, et al.
U.S. Appl. No. 11/913,325, filed Nov. 1, 2007, Schwarz-Barac, et al.
U.S. Appl. No. 60/831,222, filed Jul. 17, 2006, Hager, et al.
U.S. Appl. No. 11/970,190, filed Jan. 7, 2008, Schultes, et al.
U.S. Appl. No. 12/094,277, filed May 20, 2008, Schultes, et al.
U.S. Appl. No. 12/300,408, filed Nov. 11, 2008, Hoess, et al.

* cited by examiner

MULTILAYERED FILM MADE OF (METH)ACRYLATE COPOLYMER AND POLYCARBONATE

The invention relates to a multilayer film composed of (meth)acrylate copolymer and polycarbonate, to processes for its production, and also to use and to semicompatible polymer mixtures composed of (meth)acrylate copolymers and polycarbonate.

PRIOR ART

In the article "Folie statt Lackierung" in Kunststoffe 8/2003, pp. 84-87 (©Carl Hanser Verlag, Munich (www.kunststoffe.de) volume 93) Grefenstein, A. and Kaymak, K. describe materials technologies for external bodywork parts of motor vehicles based on backing layers composed of ASA (acrylate-styrene-acrylonitrile graft copolymer), ASA/PC (acrylate-styrene-acrylonitrile graft copolymer/polycarbonate), ABS (acrylonitrile-butadiene-styrene) and SAN (multilayer-structure films with UV-containing outer layer and colour layers thereunder. The outer layers may be coextruded from PMMA or SAN (styrene-acrylonitrile copolymer). The films may be back-moulded or back-foamed with various plastics, e.g. polybutylene terephthalates or polyurethanes, examples of possible systems here being those with glass fibre reinforcement.

DE 37 19 239 A1 describes transparent, thermo-plastically processable polymer mixtures composed of (meth)acrylate copolymers and of polycarbonates. These are compatible polymer mixtures. Mention is made of the fact that, by way of example, methyl methacrylate copolymers with from 5 to 50% by weight of cyclohexyl methacrylate and with an $\eta_{spec}/c$ of from 40 to 45 ml/g are compatible over the entire alloy range with bisphenol A polycarbonate, e.g. Makrolon® 1189, whose $\eta_{spec}/c$ (measured in chloroform) is 43 ml/g. Glass-clear polymers are obtained.

DE 38 37 589 A1 describes a methacrylate protective layer intended for polycarbonate and comprising UV absorber. Multilayer plastics articles are claimed with a core layer composed of more than 50% by weight of aromatic polycarbonate and, applied thereto, a layer comprising UV absorber and composed of (meth)acrylate copolymers, which may then have been covered by further layers. Suitable (meth)acrylate copolymers recommended comprise those which can form compatible mixtures with polycarbonate. This achieves, by way of example, good adhesion of the (meth)acrylate copolymer layers to the polycarbonate backing. The (meth)acrylate copolymers compatible with polycarbonate may, by way of example, be copolymers composed of 80% by weight of methyl methacrylate and 20% by weight of cyclohexyl methacrylate. The interpretation of polycarbonates, and also of (meth)acrylate copolymers, is general and very wide, and the simplified assumption is made here that mixtures of the components in any ratio are compatible with one another.

The methacrylate copolymers selected on the basis of their good adhesion as protective layers for polycarbonate plastics form compatible mixtures with the polycarbonate derived from bisphenol A, as required by the criteria of the "Transition Temperature Method" and the "Optical Method" as demanded for compatible polymer mixtures and described in the chapter "Compatible Polymers" in Polymer Handbook, second edition, copyright C 1975, by John Wiley & Sons, III, 211. These compatible mixtures can be further characterized by their LCST behaviour (D. R. Paul, Polymer Blends and Mixtures, 1985, pp. 1-3; Martinus Nijhoff Publishers, Dordrecht, Boston Lancaster; Kirk-Othmer, 3rd Ed. Vol. 18, pg. 443-478, J. Wiley 1982) by having a lower demixing point of $\geq 120°$ C., particularly $\geq 150°$ C. The experimental method here determines the cloud point ($T_{cl}$), on a Kofler hot bench (Chem. Ing.-Technik 1950, p. 289), for example, which characterizes the homogeneous-to-heterogeneous phase transition of the mixture, which is a function of the qualitative and quantitative composition of the mixture.

OBJECT AND ACHIEVEMENT

The object was to provide a multilayer film intended to meet the type of stringent requirements in particular prevailing for applications in exterior bodywork parts of motor vehicles. In particular, the intention is to achieve good mechanical properties of the material with high values for the modulus of elasticity (ISO 527-2) at 23 and 100° C. and tensile strain at break (ISO 527-2) at 23° C. and 100° C. Further requirements are high weathering resistance and high chemical resistance, and also high heat resistance. A further intention, however, was that waste film material should also be recyclable. This is not only desirable in order to protect the environment but is also intended to permit efficient utilization of the waste film material arising as cut material during processing.

The object is achieved via a multilayer film, encompassing at least one upper layer a) and one middle layer b) composed of (meth)acrylate copolymers, and also a backing layer c) composed of polycarbonate, characterized in that a) the upper layer comprises a light stabilizer and is composed of a (meth)acrylate copolymer which can form semicompatible mixtures with the polycarbonate of the backing layer c), where a test specimen produced from a mixture composed of 20% by weight of (meth)acrylate copolymer and 80% by weight of polycarbonate has a tensile strain at break of at least 75% (ISO 527-2) at 23° C., b) the middle layer comprises a dye and, where appropriate, a light stabilizer, and is composed of an identical or different (meth)acrylate copolymer which can form semicompatible mixtures with the polycarbonate of the backing layer c), where a test specimen produced from a mixture composed of 20% by weight of (meth)acrylate copolymer and 80% by weight of polycarbonate has a tensile strain at break of at least 75% (ISO 527-2) at 23° C., c) the backing layer is composed of polycarbonate which can, where appropriate, comprise up to 30% by weight of the material of the layers a) and b).

The invention starts from compatible polymer mixtures composed of (meth)acrylate copolymers and polycarbonate and described in DE 38 37 589 A1 and DE 37 19 239 A1. However, it has been found that the compatible polymer mixtures described in more detail in those publications are not suitable for providing multilayer films whose material meets the desired stringent requirements, in particular for the mechanical properties of modulus of elasticity and tensile strain at break. It has now been found that the set objectives can be achieved when, according to the claims, the polymer components are adjusted in such a way that the (meth)acrylate copolymers can form semicompatible mixtures with the polycarbonate of the backing layer c). The semicompatibility of the polymers here is still sufficient to ensure adequately good adhesion of the (meth)acrylate copolymers to the polycarbonate backing layer. The loss of transparency associated with the semicompatibility can be accepted, because in all cases the desired application sector can only use coloured multilayer films. The invention further provides a process for producing the multilayer films, and their uses.

(Meth)acrylate copolymer and polycarbonate here have been matched to one another in such a way that the tensile strain at break (ISO 527-2) at 23° C. of a test specimen produced from a mixture composed of 20% by weight of (meth)acrylate copolymer and 80% by weight of polycarbonate is at least 75%.

The tensile strain at break thus defined (ISO 527-2) at 23° C. of at least 75% is a relatively high base requirement for the capability of the multilayer film to withstand mechanical stress.

The backing layer c) may, where appropriate, comprise up to 30% by weight of the material of the layers a) and b). The semicompatibility of the mixtures here is the decisive precondition permitting recycling of film waste without any excessive associated impairment or alteration of physico-chemical or mechanical properties.

The invention also provides semicompatible polymer mixtures composed of (meth)acrylate copolymers and polycarbonate, and these, of course, make an important contribution to the achievement of the objects discussed in the introduction.

DESCRIPTION OF THE INVENTION

The invention provides a multilayer film, encompassing at least one upper layer a) and one middle layer b) composed of (meth)acrylate copolymers, and also a backing layer c) composed of polycarbonate. The layers a), b) and c) may comprise conventional additives and auxiliaries.

Upper Layer a)

The upper layer a) comprises at least one light stabilizer and is composed of a (meth)acrylate copolymer which can form semicompatible mixtures with the polycarbonate of the backing layer c), where the tensile strain at break (ISO 527-2) at 23° C. of a test specimen produced from a mixture composed of 20% by weight of (meth)acrylate copolymer and 80% by weight of polycarbonate is at least 75%.

Semicompatible Mixtures

Semicompatible polymer mixture composed of a (meth)acrylate copolymer and of a polycarbonate, characterized in that a test specimen produced from the polymer mixture is not transparent but is translucent as a consequence of the semicompatibility of the polymers, and the tensile strain at break (ISO 527-2) at 100° C., calculated as a relative value, of a test specimen produced from a mixture composed of 20% by weight of (meth)acrylate copolymer and 80% by weight of polycarbonate is at least 90% of the value for the polycarbonate present.

The translucency is apparent, by way of example, in a markedly reduced level of transmittance when comparison is made with clear mouldings.

The light transmittance for daylight (standard illuminant D65, 10°) $\tau_{D65}$, see, for example, DIN 5033/5036, of a test specimen composed of a mixture of equal proportions of semicompatible (meth)acrylate copolymers and polycarbonate may be in the range from 25 to 65%, for example.

The semicompatible mixture in turn differs optically from an incompatible mixture composed of polymethyl methacrylate and polycarbonate in that the latter are non-transparent and opaque, with a pearly lustre (light transmittance <25%).

(Meth)acrylate Copolymers (Meth)acrylate copolymers which can form semicompatible mixtures with the polycarbonate of the backing layer c) may be composed of the following units:
a) from 95 to 5% by weight, preferably from 93 to 50% by weight, in particular from 90 to 70% by weight, of methyl methacrylate units and, where appropriate, from 0 to 40% by weight, preferably from 0 to 10% by weight, but particularly preferably 0% by weight, of other vinylic monomer units and
b) from 5 to 95% by weight, preferably from 7 to 50% by weight, in particular from 10 to 30% by weight, of esters of (meth)acrylic acid, which may have the following radicals in the ester group:

cycloalkyl or a multiple-alkyl-substituted cycloalkyl radical having from 5 to 12 carbon atoms, where the radicals mentioned may have bonding to the (meth)acrylic acid carboxyl radical by way of alkylene groups having from 1 to 6 carbon atoms, which may also have branching, or oxyalkylene groups having from 2 to 4 carbon atoms.

Examples of suitable monomers b) are
cyclopentyl methacrylate,
cyclohexyl acrylate, cyclohexyl methacrylate,
3,3,5-trimethylcyclohexyl methacrylate,
4-tert-butylcyclohexyl acrylate, 4-tert-butylcyclohexyl methacrylate,
3-cyclohexylpropyl methacrylate.

Preference is given to (meth)acrylate copolymers which are composed of from 60 to 95% by weight, particularly preferably from 70 to 90% by weight, of methyl methacrylate and from 40 to 5% by weight, particularly preferably from 30 to 10% by weight, of cyclohexyl methacrylate.

Preference is given to (meth)acrylate copolymers whose solution viscosity in chloroform at 25° C. (ISO 1628-Part 6) is in the range from 50 to 80 ml/g, particularly preferably from 55 to 70 ml/g.

The Vicat softening point VSP (ISO 306-B50) of the (meth)acrylate copolymers is preferably at least 105° C., particularly preferably at least 106° C., in particular at least 107° C.

The MVR value for the (meth)acrylate copolymers is preferably identical with, and particularly preferably higher than, that of the melt of the layer c), and in particular the MVR value of the (meth)acrylate copolymers may be in the range from 0.8 to 2.0, preferably from 1.0 to 1.8.

Light Stabilizers

Light stabilizers are UV absorbers, UV stabilizers and free-radical scavengers.

Examples of UV stabilizers optionally present are derivatives of benzophenone, whose substituents, such as hydroxyl and/or alkoxy groups, are mostly in the 2- and/or 4-position. Among these are 2-hydroxy-4-n-octoxybenzophenone, 2,4-dihydroxybenzophenone, 2,2'-dihydroxy-4-methoxybenzophenone, 2,2',4,4'-tetra-hydroxybenzophenone, 2,2'-dihydroxy-4,4'-dimethoxy-benzophenone, 2-hydroxy-4-methoxybenzophenone. Other very suitable UV stabilizer additives are substituted benzotriazoles, among which are in particular 2-(2-hydroxy-5-methylphenyl)benzotriazole, 2-[2-hydroxy-3,5-di(alpha,alpha-dimethylbenzyl)phenyl]benzotriazole, 2-(2-hydroxy-3,5-di-tert-butylphenyl)benzotriazole, 2-(2-hydroxy-3-5-butyl-5-methylphenyl)-5-chlorobenzotriazole, 2-(2-hydroxy-3,5-di-tert-butylphenyl)-5-chlorobenzotriazole, 2-(2-hydroxy-3,5-di-tert-amyl-phenyl)benzotriazole, 2-(2-hydroxy-5-tert-butylphenyl)benzotriazole, 2-(2-hydroxy-3-sec-butyl-5-tert-butylphenyl)benzotriazole and 2-(2-hydroxy-5-tert-octylphenyl)

benzotriazole; phenol, 2,2'-methylenebis[6-(2H-benzo-triazol-2-yl)-4-(1,1,3,3-tetramethylbutyl)].

Besides the benzotriazoles, it is also possible to use a UV absorber of the class represented by the 2-(2'-hydroxyphenyl)-1,3,5-triazines, such as phenol, 2-(4,6-diphenyl-1,2,5-triazin-2-xy)-5-(hexyloxy), for example.

Other UV stabilizers which may be used are ethyl 2-cyano-3,3-diphenylacrylate, 2-ethoxy-2'-ethyloxanilide, 2-ethoxy-5-tert-butyl-2'-ethyloxanilide and substituted phenyl benzoates.

The light stabilizers or UV stabilizers may be present in the form of low-molecular-weight compounds as given above in the polymethacrylate compositions to be stabilized. However, there may also be UV-absorbing groups covalently bonded within the matrix polymer molecules after copolymerization with polymerizable UV-absorption compounds, e.g. acrylic, methacrylic or allyl derivatives of benzophenone derivatives or of benzotriazole derivatives. The proportion of UV stabilizers, which may also be mixtures of chemically different UV stabilizers, is generally from 0.01 to 10% by weight, especially from 0.01 to 5% by weight, in particular from 0.02 to 2% by weight, based on the (meth)acrylate copolymer of the layer a).

Examples which may be mentioned here of free-radical scavengers/UV stabilizers are sterically hindered amines, known as HALS (Hindered Amine Light Stabilizers). They may be used for inhibiting ageing processes in paints and in plastics, especially in polyolefins (Kunststoffe, 74 (1984) 10, pp. 620-623; Farbe+Lack, Volume 96, 9/1990, pp. 689-693). The tetramethylpiperidine group present in the HALS compounds is responsible for their stabilizing action. This class of compound may have no substitution on the piperidine nitrogen, or else have alkyl or acyl substitution thereon. The sterically hindered amines do not absorb in the UV range. They scavenge free radicals, this being a function of which the UV absorbers are in turn not capable.

Examples of stabilizing HALS compounds which can also be used in the form of mixtures are: Bis(2,2,6,6-tetramethyl-4-piperidyl)sebacate, 8-acetyl-3-dodecyl-7,7,9,9-tetramethyl-1,3,8-triazaspiro[4.5]decane-2,5-dione, bis(2,2,6,6-tetramethyl-4-piperidyl)succinate, the polymer of the succinic ester of N-β-hydroxyethyl-2,2,6,6-tetramethyl-4-hydroxypiperidine, or bis(N-methyl-2,2,6,6-tetramethyl-4-piperidyl)sebacate.

The amounts of the free-radical scavengers/UV stabilizers used in the inventive polymer mixtures are from 0.01 to 15% by weight, especially from 0.02 to 10% by weight, in particular from 0.02 to 5% by weight, based on the (meth)acrylate copolymer of the layer a).

Middle Layer b)

The middle layer comprises a dye and optionally light stabilizers, and is composed of a (meth)acrylate copolymer identical with or different from that of the layer a) and able to form semicompatible mixtures with the polycarbonate of the backing layer c), where the tensile strain at break (ISO 527-2) at 23° C. of a test specimen produced from a mixture composed of 20% by weight of (meth)acrylate copolymer and 80% by weight of polycarbonate is at least 75%.

The middle layer preferably has opaque coloration, e.g. is black or grey. Suitable dyes or pigments are known to the person skilled in the art.

(Meth)acrylate copolymers which are suitable for the layer a) are therefore also suitable for the layer b).

Backing Layer c)

The backing layer c) is composed of polycarbonate. The MVR value (ISO 1133, 230° C./3.8 kg) of the polycarbonate of the backing layer c) is preferably not more than 30% higher, or is lower, than that of the melts of the layers a) or b) which are in essence composed of the (meth)acrylate copolymers but which, where appropriate, may also comprise MVR-influencing additives or MVR-influencing auxiliaries. This requirement means that the only polycarbonates suitable for the purposes of the invention are those of comparatively high molecular weight or at least having a relatively high level of branching, these being materials which, when compared with low-molecular-weight polycarbonates known from many standard applications, generally meet relatively high mechanical requirements.

The preferred ratio between the MVR values for the (meth)acrylate copolymer and for the polycarbonate moreover favours production by the coextrusion process, because the MVR differences from the melts a) and b) are restricted by excluding polycarbonates whose melt is excessively free-flowing.

Where appropriate, the backing layer c) may comprise up to 30% by weight of the material of the layers a) and b).

The MVR value for the polycarbonate is preferably the same as, and particularly preferably lower than, that of the melts of the layers a) or b). In particular, the MVR value for the polycarbonate may be in the range from 0.2 to 2.0, preferably from 0.5 to 1.8.

The average molar mass $M_w$ of the polycarbonate of the backing layer may be in the range from 35 000 to 70 000 (g/mol). By way of example, the molar mass may be determined by the differential scanning chromatography (DSC) method or by gel chromatography on the basis of calibration standards or calibration lines.

Additives and Auxiliaries

The layers a), b) and c) may comprise conventional additives and conventional auxiliaries. Mention may be made of lubricants, e.g. pentaerythritol stearate or stearyl alcohol, the light stabilizers mentioned, and also thermal-oxidation stabilizers or process stabilizers. By way of example, *Plastics Additives Handbook, 5th edition, Ed.* Hans Zweifel, Hanser Publishers Munich, Carl Hanser Verlag Munich, 2001 lists conventional additives and conventional auxiliaries known to the person skilled in the art.

Multilayer Film

The selection of the polycarbonate and of the (meth)acrylate copolymers used in the multilayer film is such that the tensile strain at break (ISO 527-2) at 100° C., calculated as a relative value, of a test specimen produced from a mixture composed of 20% by weight of (meth)acrylate copolymer and 80% by weight of polycarbonate is at least 90% of the value for the polycarbonate present.

The selection of the polycarbonate and of the (meth)acrylate copolymers used in the multilayer film is preferably such that the absolute value of the tensile strain at break (ISO 527-2) at 100° C. for a test specimen produced from a mixture composed of 20% by weight of (meth)acrylate copolymer and 80% by weight of a polycarbonate is preferably 120% or greater.

The selection of the polycarbonate and of the (meth)acrylate copolymers used in the multilayer film is particularly preferably such that a test specimen produced from a mixture composed of 20% by weight of (meth)acrylate copolymer and 80% by weight of polycarbonate has at least four of the following five further properties:

I. a Vicat softening point VSP (ISO 306-B50) of at least 130° C.
 II. a modulus of elasticity (ISO 527-2) at 23° C. of at least 2000 MPa III. a modulus of elasticity (ISO 527-2) at 100° C. of at least 1800 MPa
IV. a tensile strain at break (ISO 527-2) at 23° C. which is at least 70% of the value for the polycarbonate present
V. a melt index MVR (ISO 1133, 230° C./3.8 kg) of from 0.5 to 2.0 cm$^3$/10 min.

Below the polycarbonate layer c), there may optionally also be an adhesion-promoting layer (primer layer) and a layer composed of a plastic, e.g. acrylate-styrene-acrylonitrile graft copolymer (ASA), polybutylene terephthalate or polyurethane, and this plastic may optionally have glass fibre reinforcement, in particular short fibre reinforcement, long fibre reinforcement, or else carbon fibre reinforcement.

This is preferably a layer composed of optionally reinforced plastic, the layer having been applied via back-moulding or back-foaming.

Process

The multilayer film may be produced in a manner known per se via lacquering, lamination, or preferably via coextrusion of the layers a), b) and c). This is possible in particular when the backing layer c) is composed of polycarbonate whose MVR value (ISO 1133, 230° C./3.8 kg) is not more than 30% higher than, preferably not more than 20% higher than, particularly preferably identical with or lower than, that of the melts of the layers a) or b) with the (meth)acrylate copolymers. In particular, the MVR value for the polycarbonate may be in the range from 0.2 to 2.0, preferably from 0.5 to 1.8.

Each of the layers a) and b) may have a thickness in the range from 5 to 200 μm, preferably from 10 to 130 μm. The backing layer may have thicknesses of, by way of example, from 100 to 5000 μm. The width of the film may be in the range, by way of example, from 100 to 2000 mm.

Recycling

The structure of the inventive multilayer film makes it possible to proceed by comminuting film waste and using it directly as backing layer c) or admixing it in the melt with the material for the backing layer c), e.g. pure polycarbonate, and coextruding the multilayer film from the melts a), b) and the melt of the, or for the, backing layer c), and this procedure may take place two or more times, with the proviso that the backing layer c) cannot comprise more than 30% by weight of the material of the layers a) and b).

If the intention is to recycle film material, e.g. cutting waste whose layers a) and b) make up 20% by weight and whose layer c) exclusively composed of polycarbonate therefore makes up 80% by weight, this material may be directly used for the melt of a new backing layer c), which then comprises 20% by weight of the material of the layers a) and b). At this proportion any impairment of the properties of a resultant backing layer or of a new multilayer film remains insignificant. In another method of recycling the material, it is admixed in relatively small proportions with a polycarbonate melt intended for the backing layer.

Uses

The inventive multilayer film may in particular be used for exterior surfaces of household appliances, of communication devices, of equipment for hobbies or for sports, of bodywork parts or of parts of bodywork parts in the construction of cars, ships or aircraft.

Semicompatible Polymer Mixtures

The invention therefore provides semicompatible polymer mixtures composed of a (meth)acrylate copolymer and of a polycarbonate, characterized in that a test specimen produced from the polymer mixture is not transparent but is translucent as a consequence of the semicompatibility of the polymers, and the tensile strain at break (ISO 527-2) at 100° C., calculated as a relative value, of a test specimen produced from a mixture composed of 20% by weight of (meth)acrylate copolymer and 80% by weight of polycarbonate is at least 90% of the value for the polycarbonate present.

The advantageous properties of the semicompatibility are clearly apparent when the proportion of one of the polymers in the mixture is at least 5% by weight, preferably at least 10% by weight or at least 20% by weight.

The translucency is apparent, by way of example, in markedly reduced transmittance when comparison is made with clear mouldings.

By way of example, the light transmittance for daylight (standard illuminant D65, 10°) $\tau_{D65}$, see, for example, DIN 5033/5036, of a test specimen of a mixture of equal proportions of semicompatible (meth)acrylate copolymers and polycarbonate may be in the range from 25 to 65%.

In the case of mouldings with a layer structure composed of the two semicompatible polymers, the location of the semicompatible mixture is at the interface between the polymers, as in the inventive multilayer film. The semicompatibility or haze at the interface is mostly not discernible by the naked eye, but can be detected, by way of example, on observing a thin section under a light microscope.

In the case of a unitary moulding or of a part of such a moulding, composed of a mixture of the two semicompatible polymers, the inventive semicompatible polymer mixture is likewise present.

In the case of the inventive multilayer film, a semicompatible polymer mixture is present at the boundary between layer b) and the backing layer c) and, where appropriate, is present in the layer c), to the extent that the latter comprises proportions of the layers a) and b).

EXAMPLES

Tests and Measurements

Standard test specimens were injection moulded both from the (meth)acrylate copolymer 1-4 treated with UV absorber and from the polycarbonate types (PCs) 1-3, and also from the 20/80 mixtures composed of the (meth)acrylate copolymer 1-4 with the PCs 1-3.
Vicat softening point VSP (ISO 306-B50)
Modulus of elasticity (ISO 527-2) at 23° C.
Modulus of elasticity (ISO 527-2) at 100° C.
Tensile strain at break (ISO 527-2) at 23° C.
Tensile strain at break (ISO 527-2) at 100° C.
Melt index MVR (ISO 1133, 230° C./3.8 kg)
Tensile strength (ISO 527-2) at 23° C.
Tensile strength (ISO 527-2) at 100° C.

Preparation of (meth)acrylate Copolymers 1-4

(Meth)acrylate Copolymer 1

0.035 part by weight of dilauroyl peroxide, 0.01 part by weight of 2,2-bis(tert-butylperoxy)butane and 0.33 part by weight of dodecyl mercaptan are dissolved in 90 parts by weight of methyl methacrylate and 10 parts by weight of cyclohexyl methacrylate. The resultant mixture is charged to a polymerization cell and devolatilized for 10 minutes. The polymerization is then carried out at 65° C. for 5 hours in a waterbath, and then for 24 hours at a waterbath temperature of 55° C. After removal of the polymerization cell from the waterbath, the polymer is heat-conditioned in the polymerization cell for a further 10 hours at 120° C. in a hot-air cabinet. The solution viscosity of the polymer in chloroform at 25° C. (ISO 1628-Part 6) is 60 ml/g (J value). The Vicat softening point VSP (ISO 306-B50) is 109.8° C.

(Meth)acrylate Copolymer 2

0.035 part by weight of dilauroyl peroxide, 0.01 part by weight of 2,2-bis(tert-butylperoxy)butane and 0.33 part by weight of dodecyl mercaptan are dissolved in 80 parts by weight of methyl methacrylate and 20 parts by weight of cyclohexyl methacrylate. The resultant mixture is charged to a polymerization cell and devolatilized for 10 minutes. The polymerization is then carried out at 65° C. for 5 hours in a waterbath, and then for 24 hours at a waterbath temperature of 55° C. After removal of the polymerization cell from the waterbath, the polymer is heat-conditioned in the polymerization cell for a further 10 hours at 120° C. in a hot-air cabinet. The solution viscosity of the polymer in chloroform at 25° C. (ISO 1628-Part 6) is 60 ml/g (J value). The Vicat softening point VSP (ISO 306-B50) is 107.2° C.

(Meth)acrylate Copolymer 3

0.035 part by weight of dilauroyl peroxide, 0.01 part by weight of 2,2-bis(tert-butylperoxy)butane and 0.40 part by weight of dodecyl mercaptan are dissolved in 90 parts by weight of methyl methacrylate and 10 parts by weight of cyclohexyl methacrylate. The resultant mixture is charged to a polymerization cell and devolatilized for 10 minutes. The polymerization is then carried out at 65° C. for 5 hours in a waterbath, and then for 24 hours at a waterbath temperature of 55° C. After removal of the polymerization cell from the waterbath, the polymer is heat-conditioned in the polymerization cell for a further 10 hours at 120° C. in a hot-air cabinet. The solution viscosity in chloroform at 25° C. (ISO 1628-Part 6) is 50 ml/g (J value).

(Meth)acrylate Copolymer 4

0.035 part by weight of dilauroyl peroxide, 0.01 part by weight of 2,2-bis(tert-butylperoxy)butane and 0.40 part by weight of dodecyl mercaptan are dissolved in 80 parts by weight of methyl methacrylate and 20 parts by weight of cyclohexyl methacrylate. The resultant mixture is charged to a polymerization cell and devolatilized for 10 minutes. The polymerization is then carried out at 65° C. for 5 hours in a waterbath, and then for 24 hours at a waterbath temperature of 55° C. After removal of the polymerization cell from the waterbath, the polymer is heat-conditioned in the polymerization cell for a further 10 hours at 120° C. in a hot-air cabinet. The solution viscosity in chloroform at 25° C. (ISO 1628-Part 6) is 50 ml/g (J value).

Light Stabilizers

Once the (meth)acrylate copolymers 1-4 had been prepared, these were pelletized together with the UV absorber Tinuvin® 360, Ciba, (0.6% by weight)

For comparison, a standard polymethyl methacrylate (PMMA) moulding composition (copolymer composed of 96% by weight of methyl methacrylate and 4% by weight of methyl acrylate with an average molar mass $M_w$ (weight-average) of about 140 000 (g/mol), incompatible with polycarbonate, is also shown.

The properties of the (meth)acrylate copolymers 1-4 and of the standard polymethyl methacrylate moulding composition are shown in Table 1.

Mixtures of the (meth)acrylate Copolymers 1-4 with Various Polycarbonates

The (meth)acrylate copolymers 1-4 compounded with UV absorber were compounded in a twin-screw extruder with three different commercially available types of polycarbonate from DOW in a weight ratio of 20:80 ((meth)acrylate copolymer to polycarbonate).

The types of PC were:
type 1 polycarbonate (Calibre® 300-10)
type 2 polycarbonate (Calibre® 200-10)
type 3 polycarbonate (Calibre® 200-23)

The properties of types 1-3 polycarbonate and their mixtures with (meth)acrylate copolymers 1-4 are shown in Table 2.

Chemicals Resistance Tests

The (meth) acrylate copolymers 1 and 2 treated with UV absorber, and also a standard polymethyl methacrylate moulding composition (copolymer composed of 96% by weight of methyl methacrylate and 4% by weight of methyl acrylate with an average molar mass $M_w$ of about 140 000 (g/mol), incompatible with polycarbonate) were extruded to give sheets, which were subjected to chemicals resistance tests.

The chemicals resistance of the inventive (meth)acrylate copolymers 1 and 2 with respect to acidic or basic aqueous solutions, and also pancreatin solution and petroleum spirit, is comparable with that of standard polymethyl methacrylate. In addition, the stress cracking resistance of extruded sheets composed of the inventive (meth)acrylate copolymers 1 and 2 on exposure to ethanol/water solutions is markedly better than that of the sheets produced using standard polymethyl methacrylate.

TABLE 1

Properties of the (meth)acrylate copolymers 1-4 and of a standard polymethyl methacrylate moulding composition

|  |  | Standard PMMA | (Meth)acrylate copolymer 1 | (Meth)acrylate copolymer 2 | (Meth)acrylate copolymer 3 | (Meth)acrylate copolymer 4 |
|---|---|---|---|---|---|---|
| Monomer composition |  |  |  |  |  |  |
| Methyl methacrylate | % by weight |  | 90 | 80 | 90 | 80 |
| Cyclohexyl methacrylate | % by weight |  | 10 | 20 | 10 | 20 |
| Properties | Unit |  |  |  |  |  |
| J value | ml/g |  | 60 | 60 | 50 | 50 |
| VSP | ° C. | 104 | 109.8 | 107.2 |  |  |
| Impact strength | kJ/m² | 20 | 22.6 | 17.4 |  |  |
| Modulus of elasticity (T = 23° C.) | MPa | 3300 | 3300 | 3200 |  |  |
| Modulus of elasticity (T = 100° C.) | MPa | 780 | 960 | 960 |  |  |
| Tensile strength (T = 23° C.) | MPa | 70.3 | 71.2 | 56.4 |  |  |
| Tensile strength (T = 100° C.) | MPa | 20.3 | 23.7 | 24.2 |  |  |

TABLE 2

Properties of types 1-3 polycarbonate and of their mixtures with the (meth)acrylate copolymers 1-4 Examples A-D: inventive, Examples E-L: non-inventive

|  |  |  |  |  | A | B | C | D | E |
|---|---|---|---|---|---|---|---|---|---|
| Blend |  |  |  |  |  |  |  |  |  |
| (Meth)acrylate |  |  |  |  | 1 | 2 | 1 | 2 | 1 |
| copolymer Proportion | % by weight |  |  |  | 20 | 20 | 20 | 20 | 20 |
| PC type |  |  |  |  |  |  |  |  |  |
| 1 | % by weight | 100 |  |  | 80 | 80 |  |  |  |
| 2 | % by weight |  | 100 |  |  |  | 80 | 80 |  |
| 3 | % by weight |  |  | 100 |  |  |  |  | 80 |
| Properties | Unit |  |  |  |  |  |  |  |  |
| Modulus of elasticity (23° C.) | MPa | 2335 | 2321 | 2350 | 2546 | 2584 | 2540 | 2547 | 2600 |
| Modulus of elasticity (100° C.) | MPa | 2080 | 2107 | — | 1910 | 1954 | 2014 | 2059 | — |
| Tensile strain at break (T = 23° C.) | % | 111 | 111 | 83.9 | 85.1 | 90.2 | 84 | 84 | 46 |
| Tensile strain at break (T = 100° C.) | % | 129 | 120 | — | 127 | 133 | 130 | 129 | — |
| Impact strength (T = 23° C.) | kJ/m$^2$ | n.f.* | n.f. | n.f. | n.f. | n.f. | n.f. | n.f. | 223 |
| VSP | ° C. | 150 | 150 | 148.6 | 139.7 | 135.4 | 136.4 | 136.7 | 136.6 |
| MVR | cm$^3$/10 min | 1.6 | 1.6 | 3.5 | 1.5 | 1.4 | 1.4 | 1.4 | 2.8 |

|  |  | F | G | H | I | J | K | L |
|---|---|---|---|---|---|---|---|---|
| Blend |  |  |  |  |  |  |  |  |
| (Meth)acrylate |  | 2 | 3 | 4 | 3 | 4 | 3 | 4 |
| copolymer Proportion | % by weight | 20 | 20 | 20 | 20 | 20 | 20 | 20 |
| PC type |  |  |  |  |  |  |  |  |
| 1 | % by weight |  | 80 | 80 |  |  |  |  |
| 2 | % by weight |  |  |  | 80 | 80 |  |  |
| 3 | % by weight | 80 |  |  |  |  | 80 | 80 |
| Properties | Unit |  |  |  |  |  |  |  |
| Modulus of elasticity (23° C.) | MPa | 2600 | 2570 | 2590 | 2550 | 2550 | 2590 | 2610 |
| Modulus of elasticity (100° C.) | MPa | — | — | — | — | — |  |  |
| Tensile strain at break (T = 23° C.) | % | 28 | 71.5 | 72.2 | 56.7 | 61.2 | 29.3 | 29.5 |
| Tensile strain at break (T = 100° C.) | % | — | — | — | — | — |  |  |
| Impact strength (T = 23° C.) | kJ/m$^2$ | n.f. | n.f. | n.f. | n.f. | n.f. | 209 | n.f. |
| VSP | ° C. | 136.9 | 137.3 | 136.1 | 138.4 | 138.7 | 136.1 | 136.0 |
| MVR | cm$^3$/10 min | 2.9 | 1.6 | 1.6 | 1.6 | 1.6 | 3.0 | 3.0 |

Abbreviations:
*n.f.: no fracture

The invention claimed is:

1. A multilayer film, comprising an upper layer a), and one middle layer b), and a backing layer c),
   wherein the multilayer film is produced by a process selected from the group consisting of lacquering, lamination and coextrusion,
   wherein
   a) the upper layer consists of a first light stabilizer and a first (meth)acrylate copolymer, and optionally contains at least one substance selected from the group consisting of a first light stabilizer, a first thermal oxidation stabilizer, a first process stabilizer, and combinations thereof;
   b) the middle layer consists of a dye and a second (meth)acrylate copolymer, and optionally contains at least one material selected from the group consisting of a second thermal oxidation stabilizer, a second process stabilizer, and a second light stabilizer, and combinations thereof; and
   c) the backing layer consists of 70-100% of polycarbonate and 0% to 30% of at least one ingredient selected from the group consisting of the first (meth)acrylate copolymer, the second (meth)acrylate copolymer, the first light stabilizer, the second light stabilizer, the dye, the first thermal oxidation stabilizer, the second thermal oxidation stabilizer, the first process stabilizer, the second process stabilizer, and combinations thereof;
   wherein the first (meth)acrylate copolymer may be the same or different from the second (meth)acrylate copolymer,
   wherein the first (meth)acrylate copolymer and the second (meth)acrylate copolymer, independently of each other, consist of the following units:

i) from 95 to 5% by weight of methyl methacrylate units and, optionally from 0 to 40% by weight of other vinylic monomer units and
b) from 5 to 95% by weight of esters of (meth)acrylic acid, wherein the radicals in the ester groups are selected from the group consisting of:
a cycloalkyl radical having from 5 to 12 carbon atoms, a multiple-alkyl-substituted cycloalkyl radical having from 5 to 12 carbon atoms, and combinations thereof, wherein the above described radicals may have bonding to the (meth)acrylic acid carboxyl radicals by way of alkylene groups having from 1 to 6 carbon atoms, which may also have branching, or oxyalkylene groups having from 2 to 4 carbon atoms,
wherein a test specimen produced from a mixture comprising 20% by weight of the (meth)acrylate copolymer from b) and 80% by weight of polycarbonate from c) has a tensile strain at break of at least 75% (ISO 527-2) at 23° C., and
wherein a test specimen produced from a mixture comprising 20% by weight of the (meth)acrylate copolymer from a) and 80% by weight of polycarbonate from c) has a tensile strain at break of at least 75% (ISO 527-2) at 23° C., and
wherein the upper layer a) is the uppermost layer of the multilayer film.

2. The multilayer film according to claim 1, wherein the first and the second (meth)acrylate copolymers in a) and b) consist of from 60 to 95% by weight of methyl methacrylate and from 40 to 5% by weight of cyclohexyl methacrylate.

3. The multilayer film according to claim 1, wherein the solution viscosity of the first and the second (meth)acrylate copolymers from a) and b), in chloroform at 25° C. (ISO 1628-Part 6) is in the range from 50 to 80 ml/g.

4. The multilayer film according to claim 1, wherein the Vicat softening point VSP (ISO 306-B50) of the first and the second (meth)acrylate copolymers from a) and b) is at least 105° C.

5. The multilayer film according to claim 1, wherein below the backing layer c) there is also an optional adhesion-promoting layer, and a layer comprising a plastic, which may optionally have been fibre-reinforced.

6. The multilayer film according to claim 5, wherein the layer comprising the plastic has been applied by back-moulding or back-foaming and the plastic comprises an acrylate-styrene-acrylonitrile graft copolymer (ASA), polybutylene terephthalate or polyurethane.

7. The multilayer film according to claim 1, wherein the middle layer has opaque coloration.

8. The multilayer film according to claim 1, wherein the polycarbonate of the backing layer c) has an average molar mass Mw in the range from 35,000 to 70,000.

9. The multilayer film according to claim 1, wherein the selection of the first and the second (meth)acrylate copolymers from a) and b) and of the polycarbonate is such that the tensile strain at break (ISO 527-2) at 100° C., calculated as a relative value, for a test specimen produced from a mixture comprising of 20% by weight of (meth)acrylate copolymers from a) and b) and 80% by weight of polycarbonate is at least 90% of the value for the polycarbonate present.

10. The multilayer film according to claim 9, wherein the absolute value of the tensile strain at break (ISO 527-2) at 100° C. is 120% or greater.

11. The multilayer film according to claim 9, wherein a test specimen produced from a mixture comprising 20% by weight of the first and the second (meth)acrylate copolymers from a) and b) and 80% by weight of polycarbonate comprises at least four of the following five properties:
I. a Vicat softening point VSP (ISO 306-B50) of at least 130° C.
II. a modulus of elasticity (ISO 527-2) at 23° C. of at least 2000 MPa
III. a modulus of elasticity (ISO 527-2) at 100° C. of at least 1800 MPa
IV. a tensile strain at break (ISO 527-2) at 23° C. which is at least 70% of the value for the polycarbonate present
V. a melt index MVR (ISO 1133, 230° C./3.8 kg) of from 0.5 to 2.0 cm³/10 min.

12. A process for producing a multilayer film according to claim 1, comprising coextruding the layers a), b) and c) to form the multilayer film.

13. The process according to claim 12, wherein the process produces a film waste, and wherein the film waste is comminuted and directly used as backing layer c) or admixed in the melt with the material for the backing layer c), and the multilayer film composed of the melts a), b) and a melt of the backing layer c) is coextruded, and the procedure may take place two or more times, with
the proviso that backing layer c) cannot comprise more than 30% by weight of the material of the layers a) and b).

14. A method of forming a substrate selected from the group consisting of exterior surfaces of household appliances, communication devices, equipment for hobbies, equipment for sports, bodywork parts and parts of bodywork parts of cars, ships or aircraft, comprising forming the substrate with the multilayer film of claim 1.

15. The multilayer film according to claim 2, wherein the Vicat softening point VSP (ISO 306-B50) of the (meth)acrylate copolymers is at least 105° C.

16. A multilayer film, comprising an upper layer a), and one middle layer b), and a backing layer c) wherein the multilayer film is produced by a process selected from the group consisting of lacquering, lamination and coextrusion, wherein
a) the upper layer consists of a light stabilizer and a first (meth)acrylate copolymer;
b) the middle layer consists of a dye and a second (meth)acrylate copolymer; and
c) the backing layer consists of 70-100% of polycarbonate and 0% to 30% of a composition at least one ingredient selected from the group consisting of the first (meth)acrylate copolymer, the second (meth)acrylate copolymer, the dye, the light stabilizer, and combinations thereof;
wherein the first (meth)acrylate copolymer may be the same or different from the second (meth)acrylate copolymer,
wherein the first (meth)acrylate copolymer and the second (meth)acrylate copolymer, independently of each other, consist of the following units:
i) from 95 to 5% by weight of methyl methacrylate units and, optionally from 0 to 40% by weight of other vinylic monomer units and
b) from 5 to 95% by weight of esters of (meth)acrylic acid, wherein the radicals in the ester groups are selected from the group consisting of:
a cycloalkyl radical having from 5 to 12 carbon atoms, a multiple-alkyl-substituted cycloalkyl radical having from 5 to 12 carbon atoms, and combinations thereof, wherein the above described radicals may have bonding to the (meth)acrylic acid carboxyl radicals by way of alkylene groups having from 1 to 6 carbon atoms, which may also have branching, or oxyalkylene groups having from 2 to 4 carbon atoms, wherein a test specimen produced from a mixture comprising 20% by weight of the (meth)acrylate copolymer from b) and 80% by weight of polycarbonate from c) has a tensile strain at break of at least 75% (ISO 527-2) at 23° C., wherein a test specimen produced from a mixture comprising 20% by weight of the (meth)acrylate copolymer from a) and 80% by weight of polycarbonate from c) has a tensile strain at break of at least 75% (ISO 527-2) at 23° C., and wherein the upper layer a) is the uppermost layer of the multilayer film.

* * * * *